Figure 1:
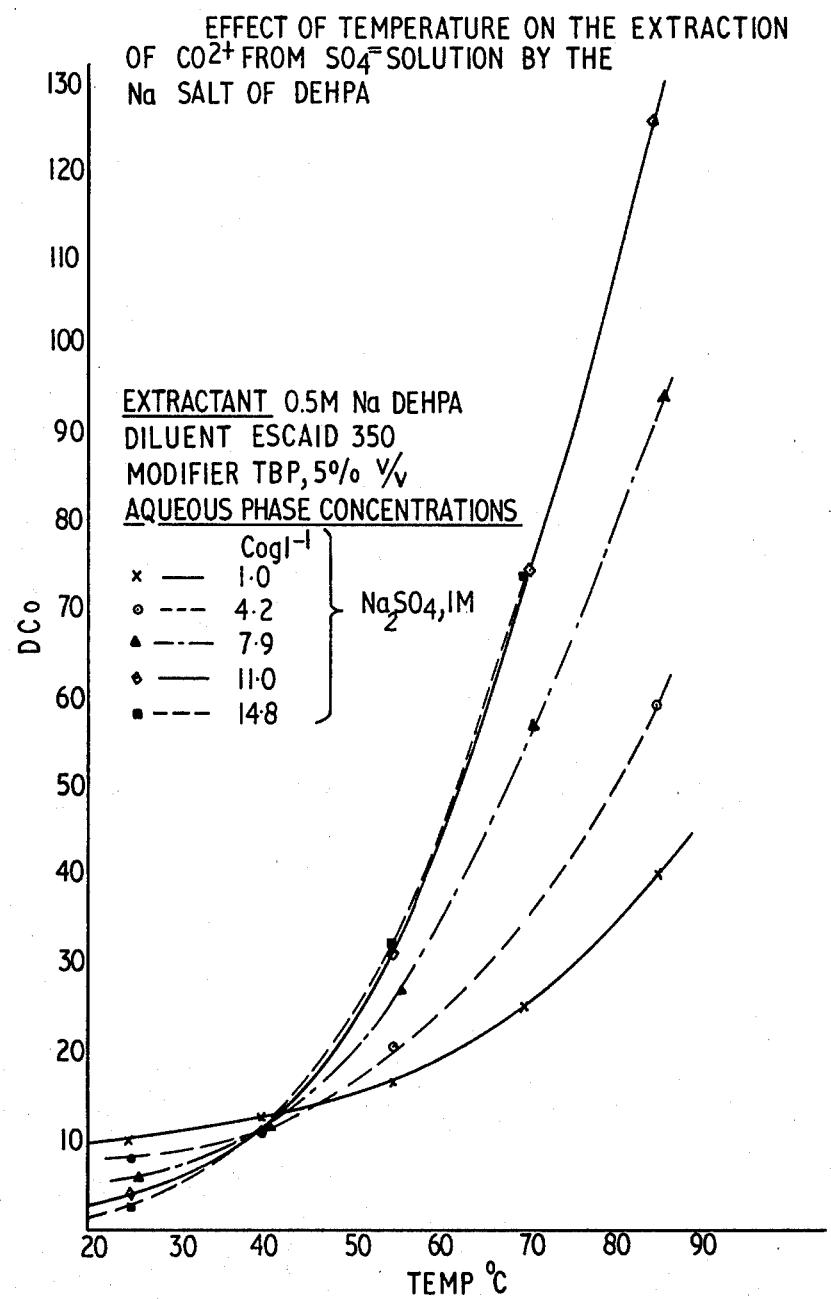

United States Patent [19]

Flett

[11] 4,210,625
[45] Jul. 1, 1980

[54] PROCESS FOR SEPARATING COBALT AND NICKEL BY SOLVENT EXTRACTION

[75] Inventor: Douglas S. Flett, Stevenage, England

[73] Assignee: Matthey Rustenburg Refiners (Proprietary) Limited, Johannesburg, South Africa

[21] Appl. No.: 868,455

[22] Filed: Jan. 10, 1978

[30] Foreign Application Priority Data

Jan. 11, 1977 [GB] United Kingdom ............... 935/77

[51] Int. Cl.$^2$ .................................................. C01G 53/00
[52] U.S. Cl. ..................................................... 423/139
[58] Field of Search ................. 423/150, 139, DIG. 14

[56] References Cited

U.S. PATENT DOCUMENTS 3,399,055  8/1968  Ritcey ................................. 423/139

FOREIGN PATENT DOCUMENTS 2308596 11/1976 France ..................................... 423/139
1499406  1/1978 United Kingdom .................... 423/139

OTHER PUBLICATIONS

Sata et al., "The Complexes Formed in the Divalent Transition Metal—Sulphuric Acid—DI—(2-Ethylhexyl)—Phosphoric Acid Extraction Systems—Cobalt (II), Nickel (II) and Copper II Complexes," *J. Inorg. Nucl. Chem.*, 1972, pp. 3721–3730.

*Proceedings of the International Solvent Extraction Conference*, 1974, Soc. Chem. Ind., London, (1974), vol. I, pp. 767–778, 871–891.

Barnes et al., *J. Inorg. and Nuclear Chemistry*, 1976, vol. 38, pp. 1065–1067.

Primary Examiner—Brian E. Hearn
Attorney, Agent, or Firm—Cushman, Darby & Cushman

[57] ABSTRACT

This invention relates to the refining of metals containing cobalt and nickel by solvent extraction.

In particular the invention relates to a process for the separation of cobalt and nickel by solvent extraction comprising contacting an aqueous solution containing cobalt and nickel ions with an organic phase containing an ester of phosphoric acid in which the temperature and concentration of cobalt in the organic phase enable substantially all of the cobalt present in that phase to convert to a tetrahedral configuration.

20 Claims, 19 Drawing Figures

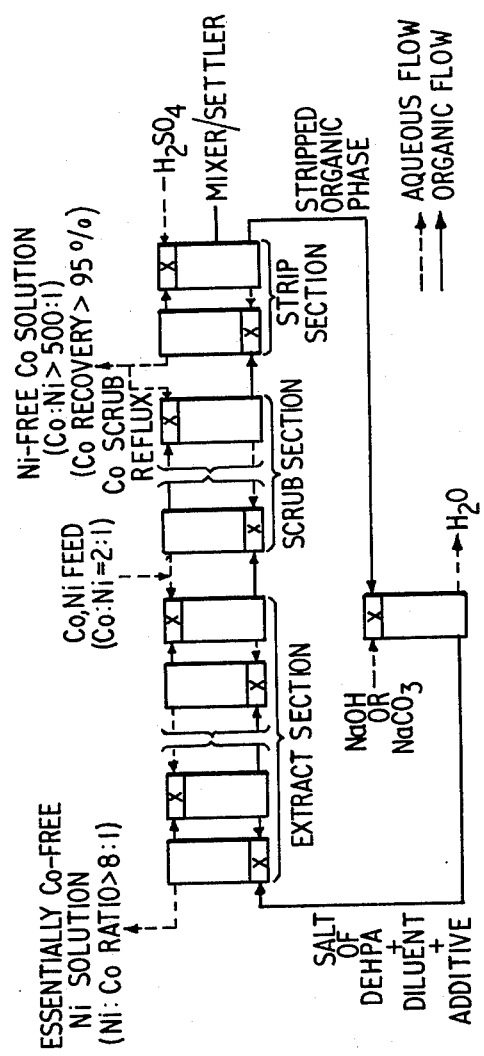
FIG. A.
SCHEMATIC DIAGRAM OF PROCESS

PROCESS FOR SEPARATING COBALT AND NICKEL BY SOLVENT EXTRACTION

This invention relates to the refining of minerals containing cobalt and nickel; more particularly the invention relates to the separation and purification of these metals by a solvent extraction process.

In U.S. Pat. No. 3,399,055 and equivalent British Pat. No. 1,141,777 there is disclosed a process for the separation of cobalt and nickel values by liquid-liquid extraction using as a solvent extraction reagent an alkali metal or an ammonium salt of an organo phosphoric acid compound of the formula:

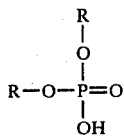

where one R may be hydrogen but where R is otherwise a substituted or unsubstituted alkyl, aryl or aralkyl radical. The invention described in the above mentioned specification was only partially successful in that separation factors achieved were not large enough to make the process viable in large scale refining. A number of attempts to improve the process have been made and one such process is described in British Pat. No. 1,466,085. In British Pat. No. 1,466,085 the separation of cobalt and nickel is improved by the use of an aqueous phase containing at least 5 grams per liter magnesium (and preferably 10–20 grams per liter magnesium) and having a pH within the range 4–7.

The present invention, which constitutes a substantial improvement over the prior art processes, is based upon the discovery that although in most circumstances both divalent cobalt and nickel ions in solution form octahedral configuration (that is to say 6 co-ordinate complexes), there are certain conditions under which the cobalt species can be compelled to convert almost exclusively to a tetrahedral configuration (i.e. forming a 4 co-ordinate complex) but in which the nickel species remains in the octahedral configuration. In these circumstances very large separation factors, for example of the order of 100 or more, can be achieved, thus enabling an economically viable process to be operated on a commercial scale.

According to one aspect of the present invention, therefore, a process for the separation of cobalt and nickel by solvent extraction comprises contacting an aqueous solution containing cobalt and nickel ions with an organic phase containing an ester of phosphoric acid in which process the temperature and concentration of cobalt in the organic phase enable substantially all of the cobalt present in that phase to convert to a tetrahedral configuration.

In order to operate the above process successfully we have found (a) that the temperature should be 40° C. or more conveniently the temperature range is 40° to 90° C., preferably 45°–86° C. and more preferably within the range 50°–70° C. and (b) that the organic phase should have a concentration of cobalt of 11 to 16.0, preferably 12 to 15.6 and more preferably 12–15.2 grams per liter. In particular we have found that operation of the process at a temperature of 45° C. and a concentration of 12 grams per liter produce particularly advantageous results. For example, using the solvent extraction reagent in a concentration of 0.5 N a 40-fold or greater increase in the separation factor can be obtained when considered relative to the value obtained at room temperature using a low cobalt concentration in the organic phase. Accordingly, the invention specifically provides a process for the separation of cobalt and nickel in which an aqueous solution containing cobalt and nickel ions is extracted at a temperature of 45° C. or more with a solution of an organic ester of ortho-phosphoric acid in an organic liquid at a pH of 4 or more, the organic liquid being substantially immiscible with water and containing dissolved cobalt in an amount of at least 12 gl$^{-1}$; and the organic phase is separated from the aqueous phase.

It has been found that operation of the process at about 50° C. is sufficient to provide a separation factor of about 50. The process can be a discrete-stage process (for example, using a mixer-settler apparatus) or a differential contact process (for example, a pulsed column contractor).

The solvent extraction reagent can be one having the formula:

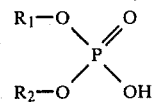

Where $R_1$ and $R_2$ which can be the same or different are each alkyl, aryl or aralkyl and in which $R_1$ or $R_2$ may be hydrogen.

Since the reagent should be substantially immiscible with water, the total number of carbon atoms in the compound should be chosen accordingly. Normally, the total number of carbon atoms is at least 12. It is preferred that there should be at least 8 carbon atoms in each R group. Many di-alkyl phosphoric acids are suitable as solvent extraction reagents in the process of the invention, but the preferred compound is di-(2-ethyl hexyl) phosphoric acid (DEPHA) which as previously mentioned is preferably used in the form of its sodium salt.

The solvent extraction reagent is normally used as an alkali metal or ammonium salt. This assists in keeping the pH relatively constant during extraction of acidic liquor containing the metals; for example a pH of 4 has been substantially maintained using the sodium salt of the solvent extraction reagent.

For reasons of viscosity and phase separation, it is generally necessary to dissolve the solvent extraction reagent in an organic liquid or diluent, which will produce the desired physical properties of the organic phase. The organic liquid should be substantially immiscible with water and not have a deleterious effect on the chemical function of the solvent extraction reagent. The organic liquid is preferably a high flashpoint aromatic or aliphatic hydrocarbon or halogenated hydrocarbon. Examples of suitable organic liquids are kerosene and naphtha.

It has been found advantageous to include an additive in the organic phase to inhibit the unwanted formation of emulsions and assist phase separation. Compounds such as tributyl phosphate or isodecanol, normally used at a 3–5% by volume content in the organic phase are particularly suitable for this purpose.

By means of the use of a sodium salt as the solvent extraction reagent, the extraction process can proceed without substantial change in the pH of the aqueous phase as the hydrogen ion does not enter into the extraction chemistry. Preferably, the aqueous phase should have an initial pH value of at least 4, for example, from 5 to 6. However, should the pH be lower than 4, the sodium salt of di-(2-ethylhexyl)phosphoric acid, for example, will extract protons from the aqueous phase in exchange for sodium until the pH range for extraction of cobalt and nickel is reached, whereupon metal ion extraction will proceed through with a reduced capacity due to the conversion of the solvent extraction reagent in the free acid.

The invention is diagrammatically illustrated in FIG. A while FIGS. 1–7 graphically illustrate various aspects of the invention.

SPECTROSCOPIC EVIDENCE

At low cobalt concentrations the extracted species is the pink octahedral complex $CoR_2.2H_2O$ (where R is the bidentate organic ligand) which converts to the blue tetrahedral form $CoR_2$ with increase in temperature and concentration. Under comparable conditions the extraction of nickel is virtually independent of temperature. It is considered that the colour change is definitely attributed to a change in co-ordination state of the Co complex, since the spectrum of the organic phase indicates that an octahedral complex is present at low temperatures and a tetrahedral complex at higher temperatures (see FIG. 8).

Figure 9:
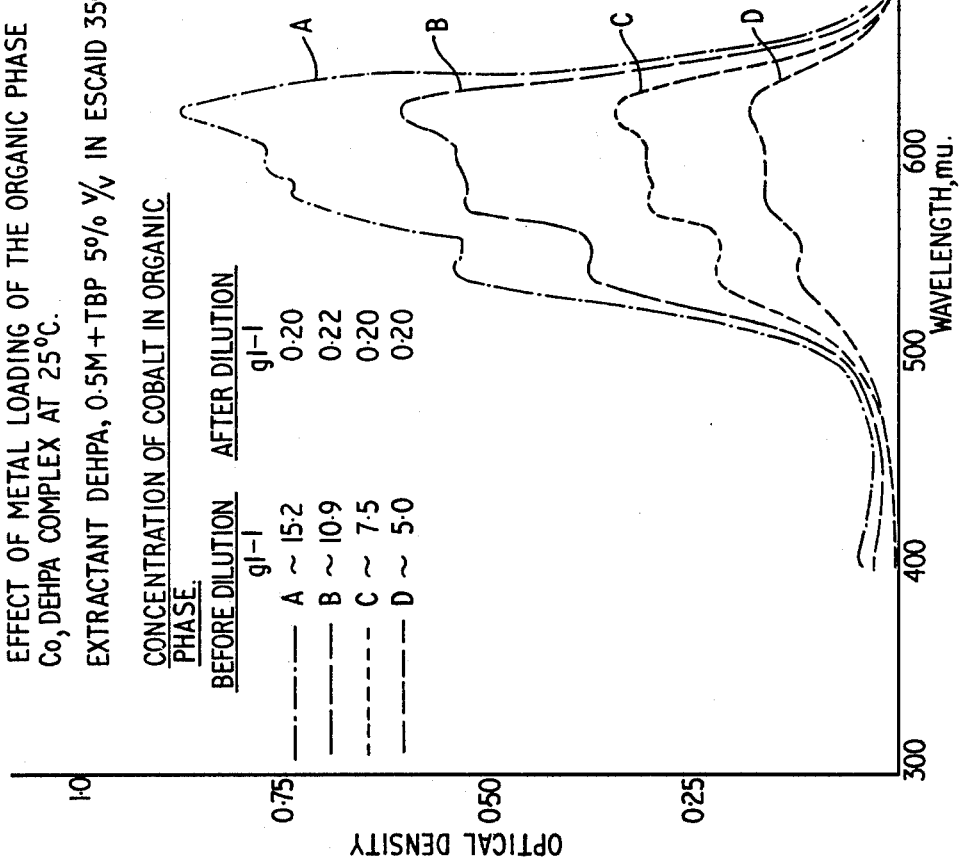
Figure 10:
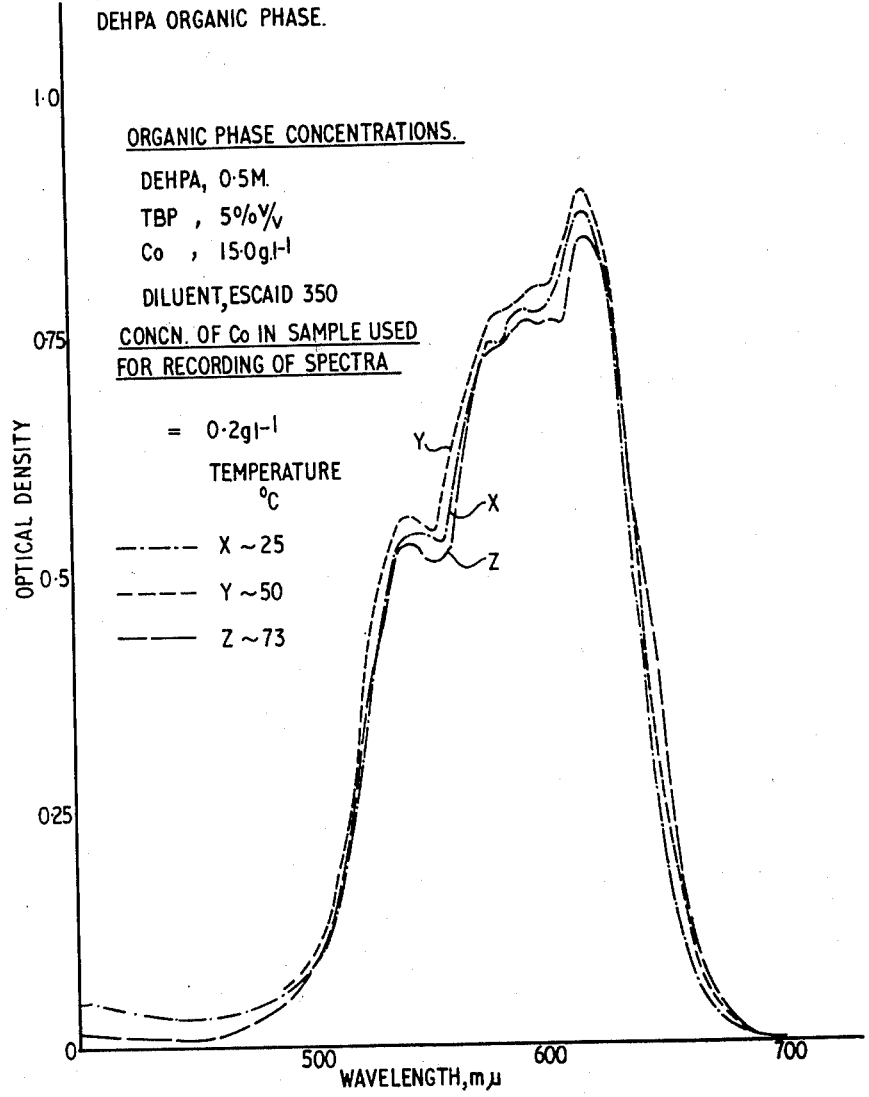

The effect of cobalt concentration of the organic phase on its spectrum is shown in FIG. 9. The figure shows that as the cobalt concentration increases, the amount of tetrahedral complex present in the organic phase also increases. The spectrum for the organic phase of cobalt concentration 15.2 grams per liter, which is fully loaded, was also recorded at different temperatures. Very little change in the spectrum was found over the range 25° C.–73° C. (as shown in FIG. 10) suggesting that only the tetrahedral complex was present in this organic phase. At the lower cobalt concentrations, however, the height of the absorption maximum was found to increase with increase in temperature. Thus the equilibrium between the octahedral and tetrahedral complex is dependent both on temperature and cobalt concentration, except under maximum loading conditions.

Figure 11:
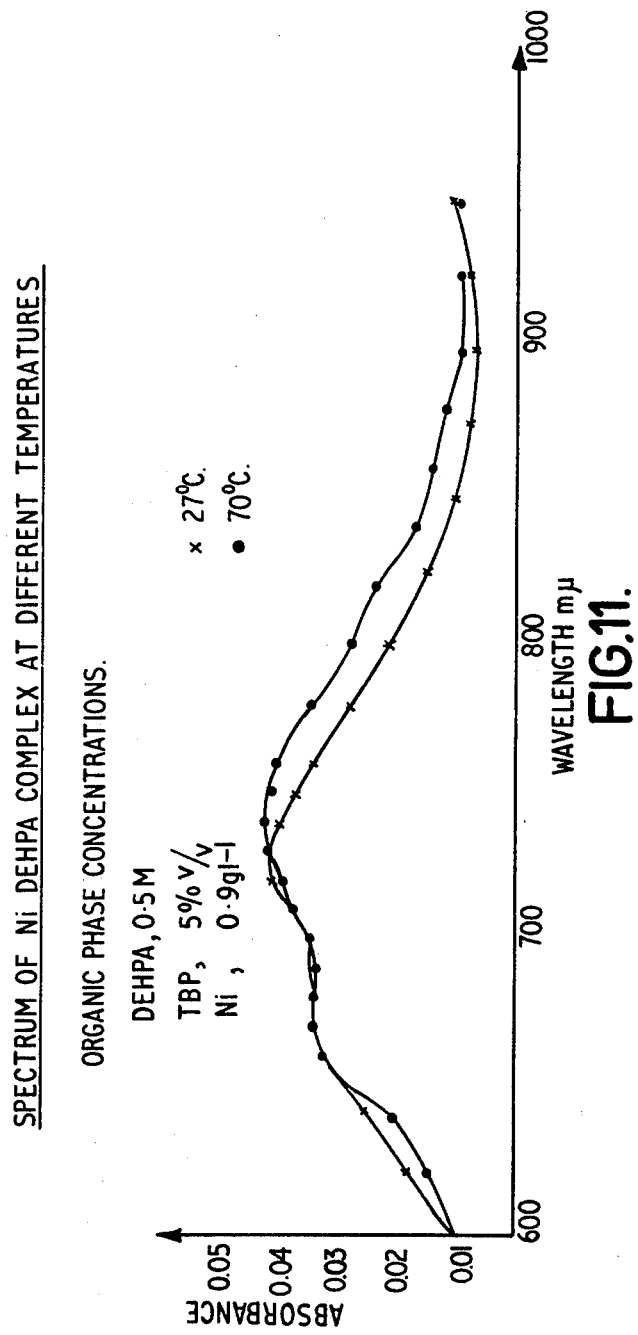
Figure 12:
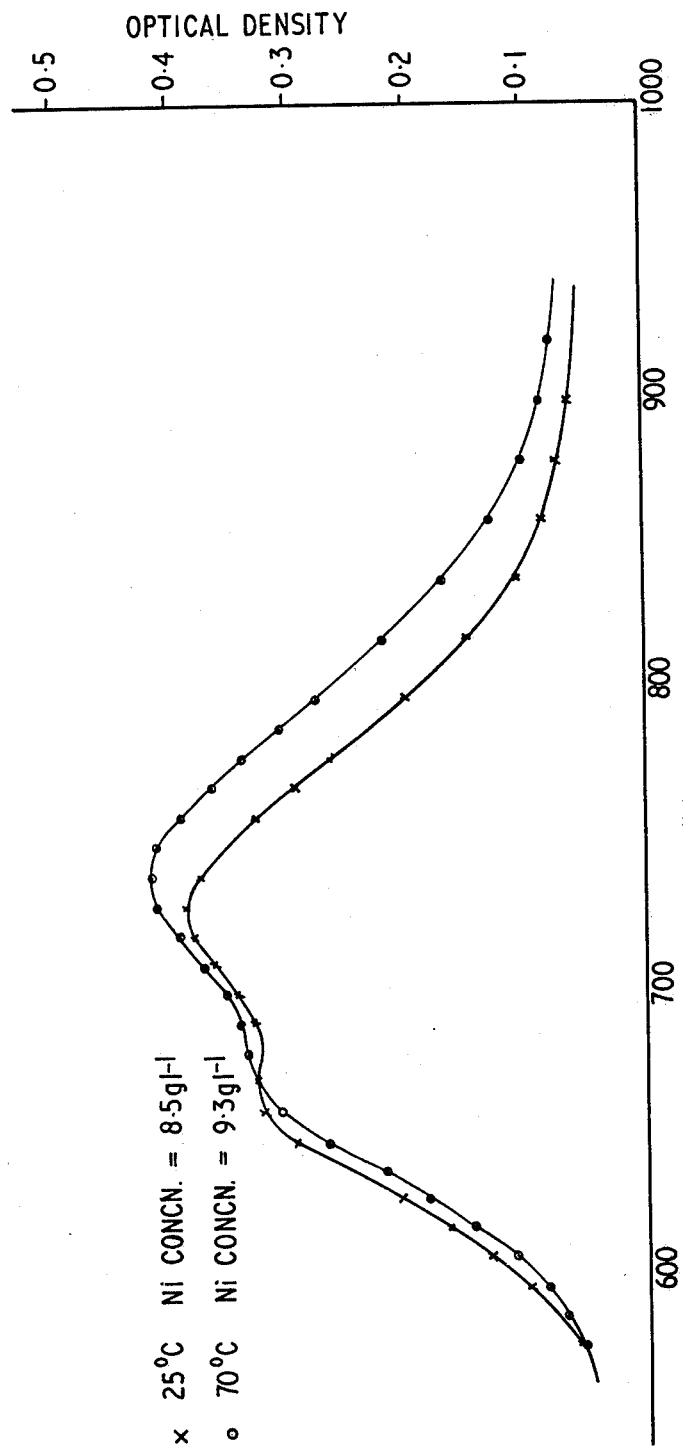

The spectroscopic results obtained with nickel bearing organic phases are shown in FIGS. 11 and 12. These spectra show that as the temperature is increased there is a slight shift in the spectrum to longer wavelengths. This is in contrast to the gross changes with temperature and concentration shown by cobalt.

The invention is illustrated by the following Examples of which Example 1 is included for the purpose of comparison.

EXAMPLE 1

Extraction tests at different temperatures were carried out in such a way that the cobalt concentration in the organic phase did not exceed 10 $gl^{-1}$.

| | Molarity of the sodium salt of DEHPA | 0.476 M |
| --- | --- | --- |
| | Diluent | Kerosene |
| | Additive | TBP 5 v/o. |
| (a) | Initial Concentration of Co | 12.05 $gl^{-1}$ |
| | Initial Concentration of Ni | 6.53 $gl^{-1}$ |
| | Phase ratio O/A | 2.0 |

| Temperature °C. | Extract Ni $gl^{-1}$ | Extract Co $gl^{-1}$ | Raffinate Ni $gl^{-1}$ | Raffinate Co $gl^{-1}$ | Separation factor |
| --- | --- | --- | --- | --- | --- |
| 20 | 2.96 | 5.44 | 0.35 | 0.48 | 1.34 |
| 50 | 3.14 | 5.74 | 0.18 | 0.09 | 3.66 |

| (b) | Initial Concentration of Co | 11.4 $gl^{-1}$ |
| --- | --- | --- |
| | Initial concentration of Ni | 6.2 $gl^{-1}$ |

| Temperature °C. | Extract Ni $gl^{-1}$ | Extract Co $gl^{-1}$ | Raffinate Ni $gl^{-1}$ | Raffinate Co $gl^{-1}$ | Separation factor |
| --- | --- | --- | --- | --- | --- |
| 35 | 2.84 | 5.40 | 0.12 | 0.14 | 1.63 |
| 75 | 2.44 | 5.40 | 0.06 | 0.04 | 3.32 |

While the results of this example show that the separation factor does increase with increasing temperature, the increase is nowhere near large enough to allow a ready separation of cobalt from nickel in any counter-current contactor.

EXAMPLE 2

Further extraction tests at different temperatures were carried out in such a way that the cobalt concentration in the organic phase exceeded 12 $gl^{-1}$.

| Molarity of the sodium salt of DEHPA | 0.476M |
| --- | --- |
| Diluent | Kerosene |
| Additive | TBP v/o |
| Initial concentration of cobalt | 12.2 $gl^{-1}$ |
| Initial concentration of nickel | 3.1 $gl^{-1}$ |
| Phase ratio O/A | 0.2 |

| Temperature °C. | Extract Ni $gl^{-1}$ | Extract Co $gl^{-1}$ | Raffinate Ni $gl^{-1}$ | Raffinate Co $gl^{-1}$ | Separation factor |
| --- | --- | --- | --- | --- | --- |
| 35 | 0.30 | 14.8 | 3.0 | 9.5 | 15.58 |
| 50 | 0.10 | 14.4 | 2.9 | 8.6 | 48.56 |
| 75 | 0.06 | 14.6 | 3.1 | 9.3 | 81.11 |

The results of these tests show clearly the double effect of high cobalt loading in the organic phase and of elevated temperature.

EXAMPLE 3

Further exemplification of the major effect of cobalt concentration in the organic phase is obtained from a successive contact test wherein an organic phase of the composition disclosed in Example 1 was contacted at a phase ratio of 1:1 with an aqueous phase containing 12.0 $gl^{-1}$ of cobalt and 6.2 $gl^{-1}$ of nickel at 50° C. After the initial contact the phases were separated and the aqueous phase analysed for nickel and cobalt. The organic phase was recontacted with a fresh equal volume of aqueous phase.

| Contact No. | Extract Ni $gl^{-1}$ | Extract Co $gl^{-1}$ | Raffinate Ni $gl^{-1}$ | Raffinate Co $gl^{-1}$ | Separation factor |
| --- | --- | --- | --- | --- | --- |
| 1 | 2.4 | 11.07 | 3.8 | 0.93 | 18.8 |
| 2 | 0.3 | 13.57 | 8.3 | 9.50 | 39.5 |

It will be seen that the separation factor has more than doubled as the cobalt concentration in the organic phase increased beyond 12 $gl^{-1}$.

EXAMPLE 4

Figure 17:
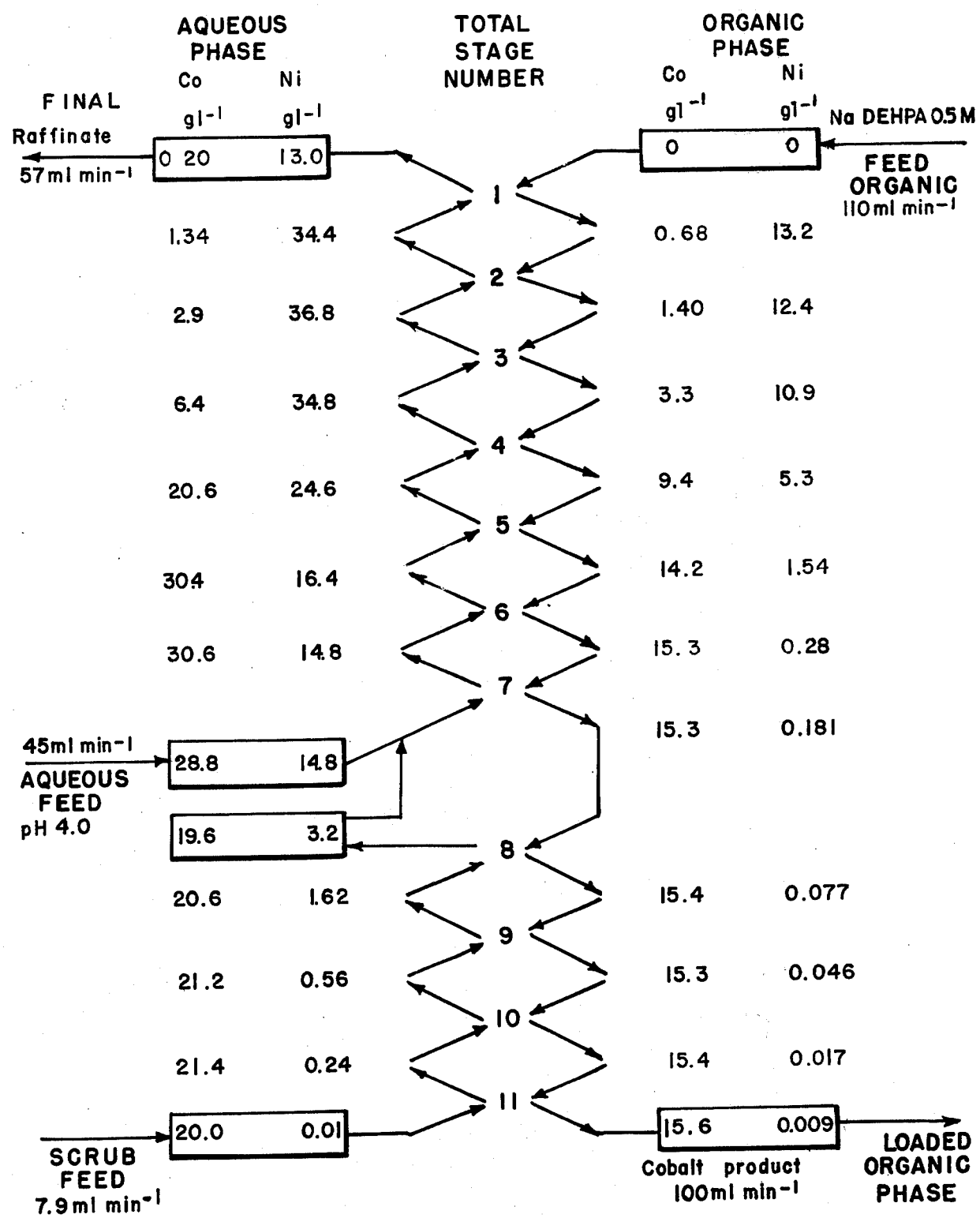

A continuous countercurrent extraction of cobalt from nickel was carried out in a mixer settler apparatus at 50° C. using the sodium salt of DEHPA in 0.5 M solution. The results show that from a feed containing 28.8 gl$^{-1}$ cobalt and 14.8 gl$^{-1}$ nickel with a combination of seven extraction stages and four scrubbing stages, a final cobalt product representing >99% of the original cobalt was obtained with a cobalt to nickel ratio of >1700:1. Flow rates and interstage concentrations are shown in FIG. 17.

EXAMPLE 5

This Example describes a countercurrent process which is a preferred embodiment of the invention, and is with reference to the accompanying FIG. A which is a schematic representation.

The sodium salt of DEHPA dissolved in a suitable diluent together with an appropriate additive is contacted countercurrently with an aqueous feed solution containing cobalt and nickel. Under optimum conditions of temperature and organic phase cobalt concentration the number of extract stages will not exceed eight. The loaded organic phase from the extract section proceeds to a scrub section wherein the cobalt-loaded organic phase is scrubbed with a portion of the final cobalt produce in a refluxing operation. This action causes a considerable improvement in the Co:Ni ratio in the organic phase as the cobalt in the reflux exchanges with the nickel in the organic phase advancing with the cobalt from the extract section. Under optimum conditions no more than four stages should be required in this section. The aqueous reflux phase, after traversing the scrub section, combines with the aqueous feed to ensure that loss of cobalt from the system is minimised. The scrubbed organic is then passed to the stripping section wherein the cobalt product is removed in two stages from the organic phase by the action of a mineral acid. The amount of acid required is an amount equal to or just greater than the stoichiometric amount to release all the cobalt, and regenerate the free DEHPA. Any mineral acid can be used but sulphuric acid is preferred if the cobalt is subsequently to be recovered by electrowinning. The stripped organic acid is recycled to mixer-settler units for regeneration of the sodium salt of DEHPA formed by addition of the stoichiometric amount of sodium hydroxide or sodium carbonate. The phase ratios chosen in the various sections are dependent on the extractant concentration, the cobalt concentration in the feed, the percentage reflux and the concentration of cobalt desired in the final product solution compatible with the limiting effective cobalt concentration on the organic phase for successful operation of the process. The choice of diluent should be such as to achieve a temperature of operation as high as economically possible. Also, for successful operation, the feed solution should be purified from deleterious materials, in particular copper and ferric iron, before solvent extraction treatment.

In the following Example, namely, Example 6, the effects of temperature and metal ion concentration on the separation of cobalt from nickel are investigated. At low cobalt concentration the extracted species is in the "pink" octahedral complex $CoR_2 2H_2O$ which converts to the "blue" tetrahedral form $CoR_2$ with increased temperature and concentration. Under comparable conditions the extraction of nickel is shown to be virtually independent of temperature. Example 6 also shows that the separation factor $\beta_{Ni}^{Co}$ for the exchange reaction between aqueous Co and organic Ni phases at high metal ion concentrations, increases with temperature. The Example also shows the effect of aromaticity of the diluent and the influence of modifiers tributyl phosphate and isodecanol.

EXAMPLE 6

The samples of cobalt sulphate and nickel sulphate used in this example were of ordinary reagent grade.

Di(2-ethylhexyl) phosphoric acid (DEHPA) was obtained from the British Drug House Company and this was used without further purification.

Solutions of the sodium salt of DEHPA used in this example contained 0.5 M DEHPA and 5% $v/v$ tributyl (TBP) or isodecanol in the test diluent.

The following diluents were used: ESCAID $^{100}/25$ (aromatic content 20%), ESCAID $^{111}/25$ (aromatic content 0.3%), ESCAID 350 (aromatic content 97%).

The distribution studies investigated in this example were carried out in a 1 l multi necked reaction vessel, fitted with thermometer, condenser and motor driven stirrer.

A UNICAM SP 191 atomic absorption spectrophotometer was used for the metal ion analyses and organic phase spectra were measured with a UNICAM SP 500 spectrophotometer.

Distribution Measurements

The effect of metal ion concentration on the distribution of cobalt between aqueous and organic phases containing $CoSo_4 + 1$ M $Na_2SO_4$ and the sodium salt of DEHPA respectively was measured over a temperature range of 25° to 85° C. for a Co concentration range of 1 to 15 gl$^{-1}$. The phases were contacted for 30 minutes at each selected temperature and, after equilibration, small volumes of each phase were removed and analysed for metal ion content. Comparative tests for nickel were carried out at concentration levels of 1 and 14 gl$^{-1}$. The diluent used in all these studies was ESCAID 350. The effect of sodium sulphate concentration was also determined.

The effect of aromaticity of the diluent on the temperature dependence of the extraction of Co from $CoSO_4$ solutions containing 10 gl$^{-1}$ metal ion, but no $Na_2SO_4$, by the Na salt of DEHPA was examined over a temperature range of 25°-75° C. using the diluents ESCAID $^{111}/25$, ESCAID $^{100}/25$ and ESCAID 350. Both tributyl phosphate (TBP) and isodecanol were used as phase modifiers. In order to determine whether the temperature effect was reversible the distribution of Co was measured during both heating and cooling. Similar tests were carried out using $NiSO_4$ solutions but ESCAID $^{100}/25$ was not used since colour changes of the organic phase had been noted in the Co extraction tests when this diluent was used which appeared to indicate oxidation of the Co complex.

The spectra of some of the organic phases from the distribution measurements were recorded at different temperatures using 1 cm cells and a jacketed cell carriage through which water, at constant temperature, was pumped.

A. Distribution Studies (i) Effect of Metal Ion Concentration.

The effect of cobalt concentration on the temperature dependence of the reaction between $CoSO_4$ and the sodium salt of DEHPA is shown graphically in FIG. 1 and the associated numerical results are given in Table 1. From these results it is seen that the extraction of Co shows a pronounced increase with respect to both temperature and metal ion concentration over the range 1 to 10 gl$^{-1}$. No further increase was found at higher metal ion concentrations and a decrease in the temperature effect was observed at Co concentrations >15 gl$^{-1}$ due to saturation of the extractant.

From Table 1 it will be seen that the change in the distribution factor $D_{Co}$ over a temperature range of 25°–70° C. showed a marked increase as the Co loading increased and this is summarised as follows:

| Loading gl$^{-1}$ | Increase. |
|---|---|
| 1.06 | 2.39 |
| 7.9 | 9.3 |
| 11.0 | 17.38 |
| 14.8 | 25.5 |

Figure 2:
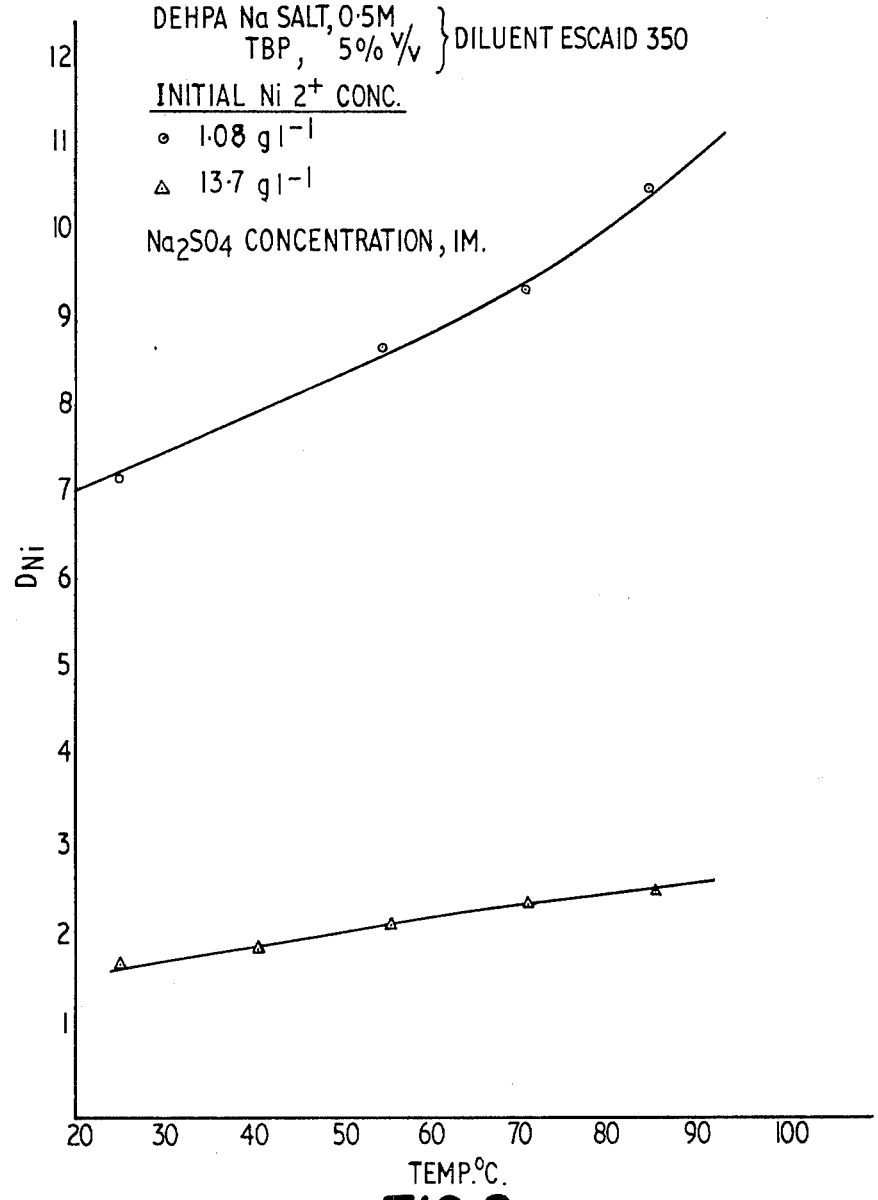
Figure 3:
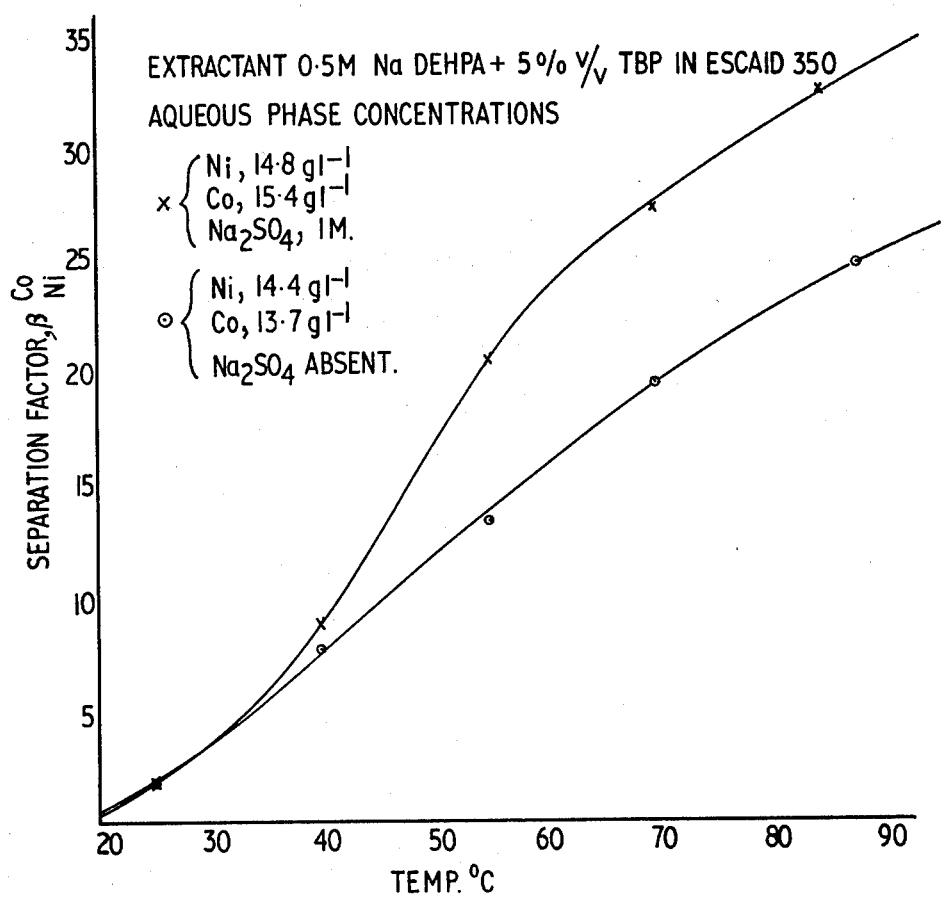
Figure 4:
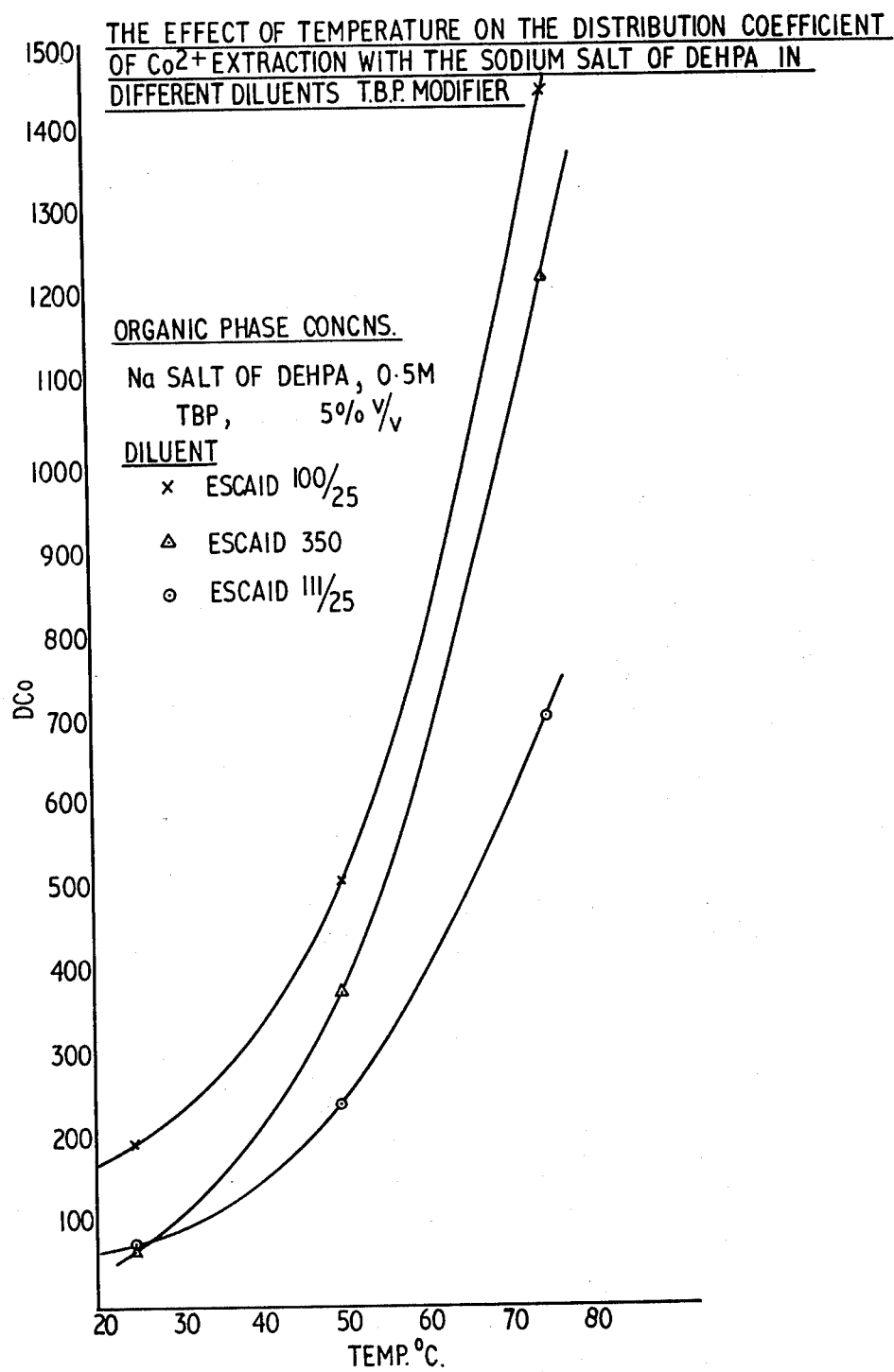
Figure 5:
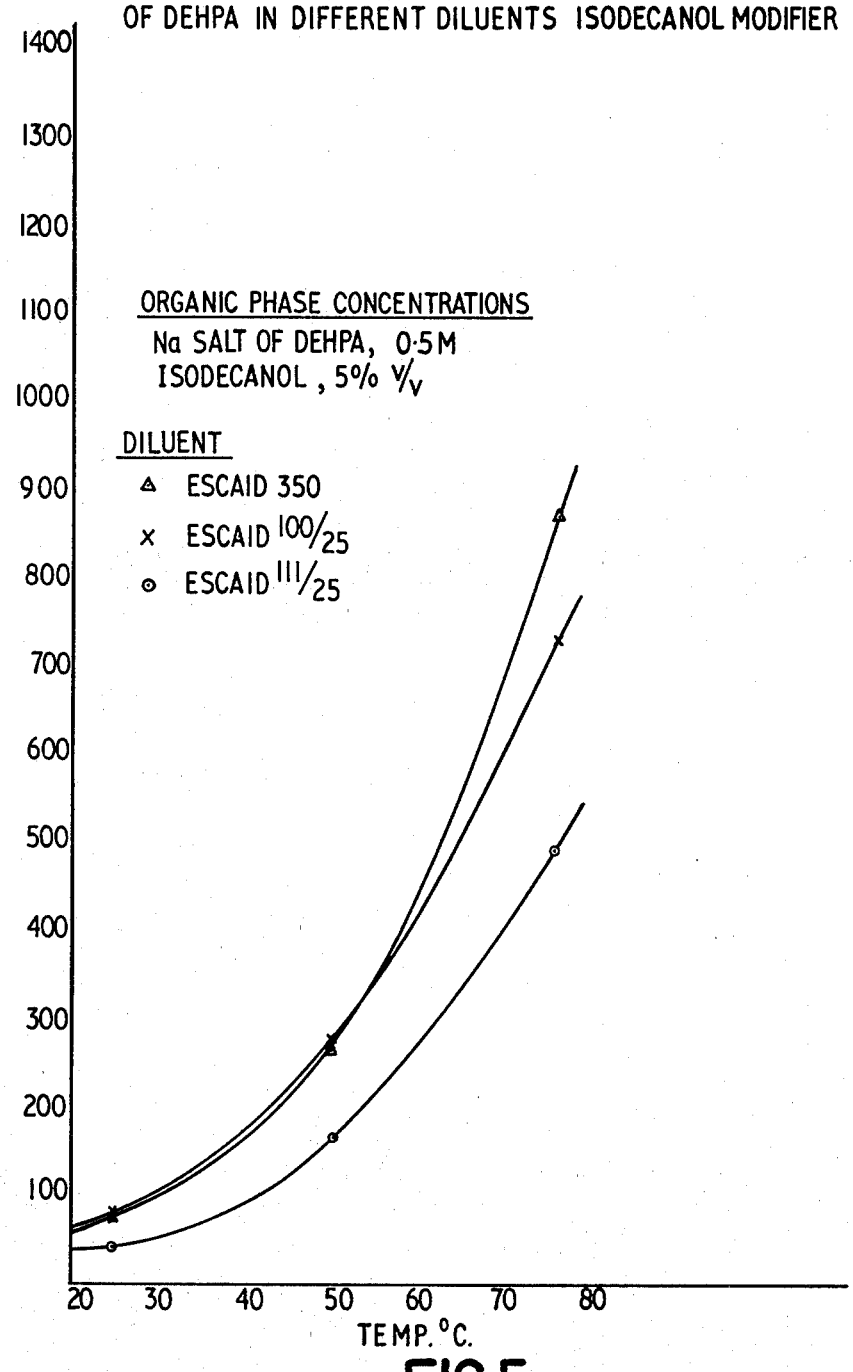

A small increase in the extraction of Ni with temperature was found at metal ion concentration levels of both 1 and 14 gl$^{-1}$, as shown graphically in FIG. 2, but this effect appeared to be almost independent of the metal ion concentration as shown in Table 2.

(ii) Effect of Ionic Strength.

The effect of ionic strength on the separation factor of cobalt from nickel for mixed solution containing no sodium sulphate and 1 M sodium sulphate is shown in Table 3. Examination of the numerical values given in the table shows that the presence of sodium sulphate increases the separation factor. The variation of separation factor with temperature for the two levels of Na$_2$SO$_4$ content is shown graphically in FIG. 3.

(iii) Effect of Diluent and Diluent Modifier.

The temperature dependency of the reaction between Co$^{2+}$ and the Ni salt of DEHPA was found to vary appreciably with both the aromatic content of the diluent and the phase modifier used as can be seen from Table 4. When TBP was used as the phase modifier the increase in extraction of Co over the range 25° to 75° C. was more pronounced with the ESCAID 100/25 and ESCAID 350 diluents than with the aliphatic diluent, ESCAID 111/25. However, with isodecanol as phase modifier the temperature effect increased in the order ESCAID 111/25 < ESCAID 100/25 < ESCAID 350, as shown graphically in FIGS. 4 and 5. The temperature effects were in all cases fully reversible since a reasonably good agreement was found between the measured distribution coefficient at 25° C. and 50° C. for both heating and cooling. The Co distribution coefficients given in Table 4 are evidently very much higher than those recorded in Table 1 for a Co$^{2+}$ concentration of 1.1 gl$^{-1}$ but the ionic strength was not the same in each case.

TABLE 1

Effect of Temperature on the Extraction of Co$^{2+}$ from SO$^-$ Solution by the Na Salt of DEHPA at Different Initial Metal Concentrations Organic phase concentrations: Na DEHPA, 0.5M, TBP, 5% v/v
Diluent - Escaid 350

| Initial Co$^{2+}$ concn gl$^{-1}$ | Temp. °C. | Final metal ion distribution aqueous gl$^{-1}$ | organic gl$^{-1}$ | $D_{Co}$ |
|---|---|---|---|---|
| 1.05 | 25 | 0.086 | 0.90 | 10.5 |
| " | 40 | 0.073 | 0.93 | 12.8 |
| " | 55 | 0.057 | 0.96 | 16.8 |
| " | 70 | 0.039 | 0.98 | 25.1 |
| " | 85 | 0.025 | 1.00 | 40.0 |
| 4.2 | 25 | 0.42 | 3.52 | 8.4 |
| " | 40 | 0.33 | 3.64 | 11.0 |
| " | 55 | 0.18 | 3.72 | 20.6 |
| " | 65 | 0.10 | 3.96 | 39.6 |
| " | 84.5 | 0.073 | 4.30 | 59.0 |
| 7.9 | 26 | 1.02 | 6.2 | 6.1 |
| " | 41 | 0.56 | 6.7 | 11.9 |
| " | 56 | 0.25 | 6.8 | 27.2 |
| " | 71 | 0.12 | 7.05 | 56.8 |
| " | 86 | 0.075 | 7.05 | 94.0 |
| 11.0 | 25 | 2.10 | 8.9 | 4.2 |
| " | 40 | 0.85 | 9.8 | 11.5 |
| " | 55 | 0.33 | 10.4 | 31.5 |
| " | 70.5 | 0.15 | 10.8 | 73.0 |
| " | 84.5 | 0.09 | 11.3 | 125.6 |
| 14.8 | 25 | 3.4 | 9.8 | 2.9 |
| " | 40 | 1.08 | 12.1 | 11.2 |
| " | 55 | 0.40 | 13.1 | 32.8 |
| " | 70 | 0.19 | 14.1 | 74.0 |

TABLE 2

Effect of Temperature on the Extraction of Ni from SO$_4^=$ Solution by the Na Salt of DEHPA at Different Initial Metal Ion Concentrations Organic phase concentrations: Na DEHPA, 0.5M, TBP, 5% v/v
Diluent - Escaid 350

| Initial Ni$^{2+}$ concn. | Temp. °C. | Final metal ion distribution aqueous gl$^{-1}$ | organic gl$^{-1}$ | $D_{Ni}$ | Relative increase in D i.e. $D_t$, 25° C. |
|---|---|---|---|---|---|
| 1.08 | 25 | 0.128 | 0.93 | 7.2 | |
| " | 55 | 0.110 | 0.95 | 8.6 | 1.20 |
| " | 71 | 0.103 | 0.96 | 9.3 | 1.29 |
| " | 85 | 0.093 | 0.97 | 10.4 | 1.44 |
| 13.7 | 25 | 5.0 | 8.5 | 1.70 | |
| " | 40.7 | 4.5 | 8.6 | 1.91 | 1.12 |
| " | 55.7 | 4.3 | 9.3 | 2.16 | 1.27 |
| " | 71.0 | 3.8 | 9.3 | 2.44 | 1.43 |
| " | 85.5 | 3.7 | 9.4 | 2.54 | 1.49 |

TABLE 3

Extraction of Co$^{2+}$ and Ni$^{2+}$ from a Mixed Solution by Na DEHPA over a Temperature Range: Effect of Na$_2$So$_4$ Concentration Organic phase 0.5M Na DEHPA + 5 v/o TBP in Escaid 350

Initial Aqueous Concentration  Co gl$^{-1}$  Ni gl$^{-1}$  Na$_2$SO$_4$, N
Test Nos. 1–5   13.7   14.4   0
Test Nos. 6–10  15.4   14.8   1.0

| Test No. | Temp. °C. | Aqueous phase Co gl$^{-1}$ | Ni gl$^{-1}$ | Organic phase Co gl$^{-1}$ | Ni gl$^{-1}$ | $D_{Co}$ | $D_{Ni}$ | Separation factor $\beta_{Ni}^{Co}$ |
|---|---|---|---|---|---|---|---|---|
| 1 | 25 | 6.8 | 8.6 | 7.6 | 5.3 | 1.12 | 0.62 | 1.8 |
| 2 | 40 | 3.9 | 10.6 | 10.0 | 3.5 | 2.56 | 0.33 | 7.7 |
| 3 | 55 | 2.9 | 10.9 | 10.7 | 3.0 | 3.69 | 0.28 | 13.4 |
| 4 | 70 | 2.6 | 11.1 | 11.4 | 2.5 | 4.38 | 0.23 | 19.5 |
| 5 | 88 | 2.2 | 11.5 | 2.4 | 5.14 | 0.21 | 24.6 | |
| 6 | 25 | 7.2 | 9.3 | 7.0 | 4.9 | 0.97 | 0.53 | 1.85 |

TABLE 3-continued

Extraction of $Co^{2+}$ and $Ni^{2+}$ from a Mixed Solution by
Na DEHPA over a Temperature Range: Effect of $Na_2SO_4$ Concentration Organic phase 0.5M Na DEHPA + 5 v/o TBP in Escaid 350
Initial Aqueous Concentration  Co $gl^{-1}$  Ni $gl^{-1}$  $Na_2SO_4$, N
Test Nos. 1-5   13.7   14.4   0
Test Nos. 6-10  15.4   14.8   1.0

Final metal ion distribution

| Test No. | Temp. °C. | Aqueous phase Co $gl^{-1}$ | Ni $gl^{-1}$ | Organic phase Co $gl^{-1}$ | Ni $gl^{-1}$ | $D_{Co}$ | $D_{Ni}$ | Separation factor $\beta_{Ni}^{Co}$ |
|---|---|---|---|---|---|---|---|---|
| 7  | 40 | 3.6 | 9.7  | 10.3 | 3.15 | 2.86 | 0.33 | 8.8  |
| 8  | 55 | 2.5 | 11.0 | 12.0 | 2.55 | 4.80 | 0.23 | 20.7 |
| 9  | 70 | 2.2 | 11.2 | 12.0 | 2.25 | 5.45 | 0.20 | 27.2 |
| 10 | 85 | 2.1 | 12.4 | 12.3 | 2.25 | 5.86 | 0.18 | 32.3 |

TABLE 4

Effect of Diluent and Modifier on the Variation of the Distribution Coefficient of Cobalt with Temperature Initial concentration of $Co^{2+}$ in aqueous phase = 10 $gl^{-1}$
Concentration of Na DEHPA in organic phase = 0.5M
Modifier concn. = 5% v/v

| Diluent | Aromatic content % | Modifier | Temp. °C. | Final metal ion distribution aqueous $gl^{-1}$ | organic $gl^{-1}$ | $D_{Co}$ |
|---|---|---|---|---|---|---|
| ESCAID 111/25 | 0.3 | Isodecanol | 25 (H) | 0.21 | 9.6 | 45.7 ⎫ 44 |
| " | " | " | 25 (C) | 0.22 | 9.9 | 42.3 ⎭ |
| " | " | " | 50 (H) | 0.054 | 9.3 | 183 ⎫ 165 |
| " | " | " | 50 (C) | 0.065 | 9.6 | 148 ⎭ |
| " | " | " | 75 (H) | 0.020 | 9.9 | 495 |
| " | " | TBP | 25 (H) | 0.13 | 9.3 | 72 |
| " | " | " | 50 (H) | 0.043 | 10.2 | 227 ⎫ 240 |
| " | " | " | 50 (C) | 0.043 | 10.9 | 253 ⎭ |
| " | " | " | 75 (H) | 0.015 | 10.5 | 700 |
| ESCAID 100/25 | 20 | Isodecanol | 25 (H) | 0.135 | 11.3 | 84 |
| " | " | " | 50 (H) | 0.040 | 11.2 | 280 |
| " | " | " | 75 (H) | 0.015 | 11.0 | 733 |
| " | " | TBP | 26 (H) | 0.050 | 9.7 | 194 |
| " | " | " | 50 (H) | 0.020 | 10.2 | 510 |
| " | " | " | 74.5 (H) | 0.007 | 10.1 | 1443 |
| ESCAID 350 | 97 | Isodecanol | 25 (H) | 0.13 | 9.9 | 76 ⎫ 78.5 |
| " | " | " | 25 (C) | 0.12 | 9.5 | 81 ⎭ |
| " | " | " | 50 (H) | 0.033 | 9.7 | 291 ⎫ 268 |
| " | " | " | 50 (C) | 0.040 | 9.8 | 245 ⎭ |
| " | " | " | 75 (H) | 0.011 | 9.6 | 873 |
| " | " | TBP | 25 (H) | 0.14 | 9.7 | 71 ⎫ 62 |
| " | " | " | 25 (C) | 0.15 | 9.5 | 63 ⎭ |
| " | " | " | 50 (H) | 0.028 | 9.9 | 354 ⎫ 375 |
| " | " | " | 50 (C) | 0.025 | 9.9 | 396 ⎭ |
| " | " | " | 75 (H) | 0.003 | 9.8 | 1225 |

In Tables 4 and 5 under the column "Temp. °C.", H denotes heating, and C denotes cooling.

A comparison of the results of Table 4 with respect to the modifier used indicates that, with all the diluents, higher distribution coefficients were obtained from the solution containing TBP. The lower effect found with isodecanol may be due to some solution of the tetrahedral complex by the alcohol since organic phases were noticeably violet at lower temperatures.

Figure 6:
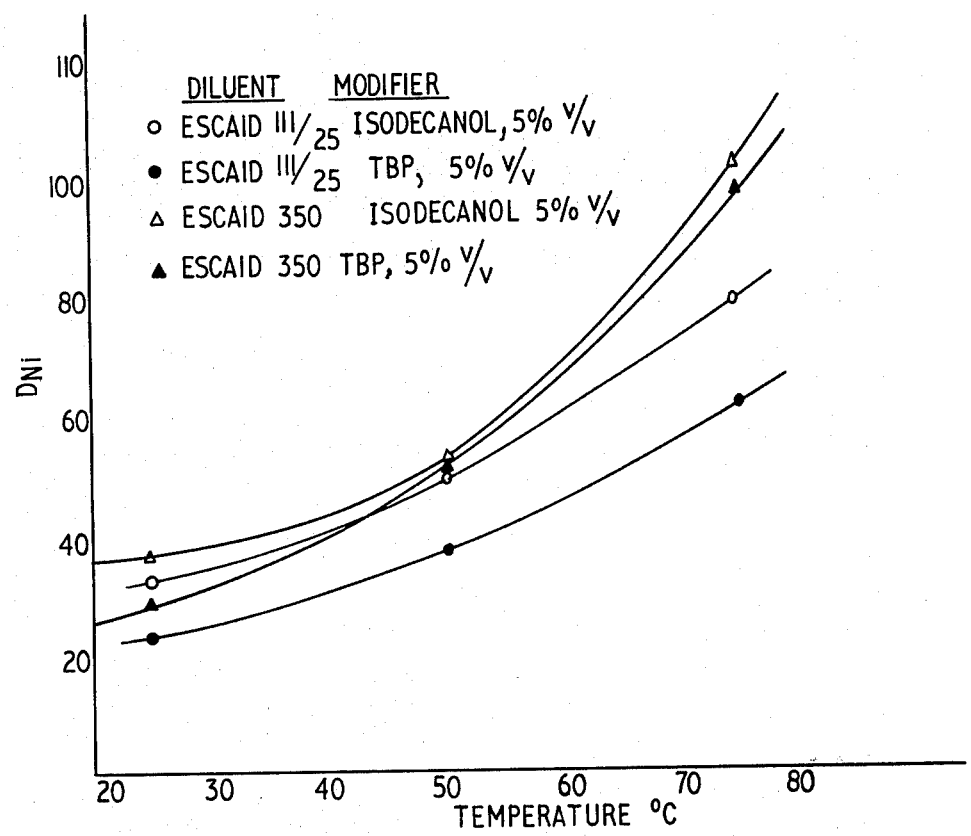
Figure 7:
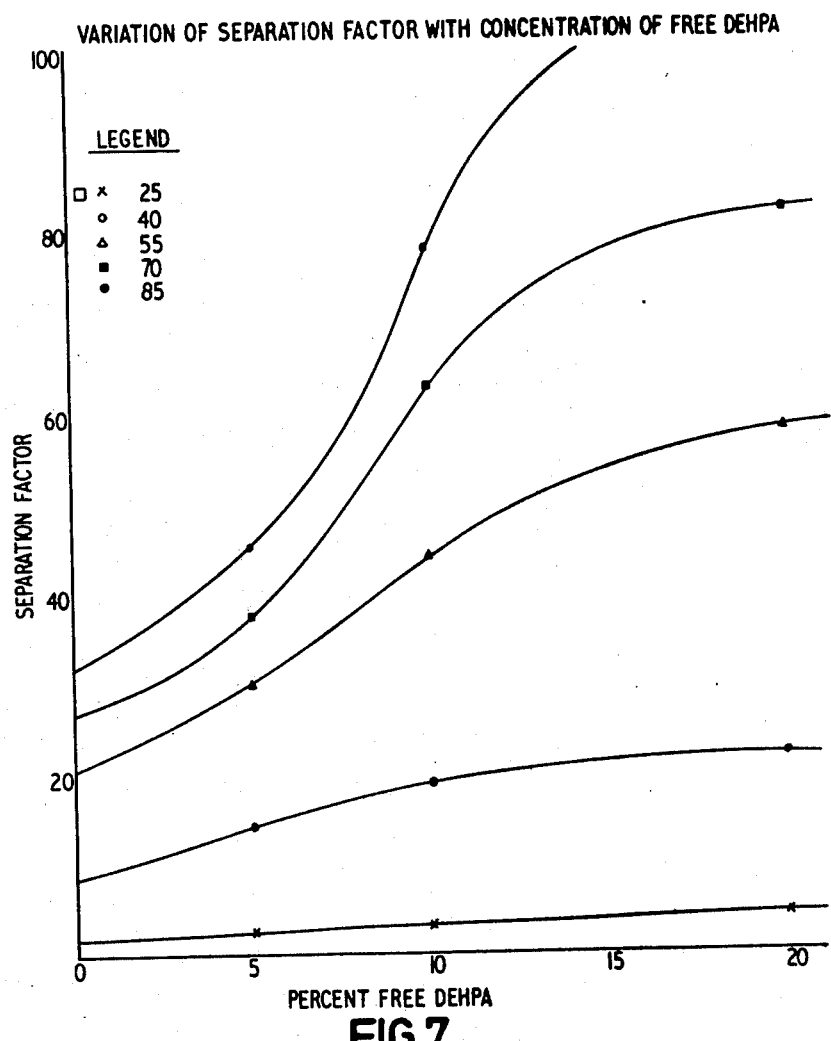

The effect of temperature on the extraction of $Ni^{2+}$ from sulphate solution by the Na salt of DEHPA in different diluent/modifier combinations is shown in Table 5 and graphically in FIG. 6. From these results it is evident that the temperature dependency of Ni extraction is also higher in the aromatic diluent. On comparing the extraction results with respect to the modifier used it can be seen that solutions of Na DEHPA containing isodecanol extracted Ni more strongly than comparable solutions containing TBP i.e. the reverse of the order found with Co.

TABLE 5

Effect of Diluent and Modifier on the Variation of the Distribution
Coefficient of Nickel with Temperature Initial concentration of $Ni^{2+}$ in aqueous phase = 10.0 $gl^{-1}$
Concentration of Na DEHPA in organic phase = 0.5M

| Diluent | Aromatic content % | Modifier | Temp. °C. | Final metal ion distribution aqueous $gl^{-1}$ | organic $gl^{-1}$ | $D_{Ni}$ | |
|---|---|---|---|---|---|---|---|
| ESCAID 111/25 | 0.3 | Isodecanol | 25 (H) | 0.28 | 9.3 | 33.2 | ⎫ 33.0 |
| " | " | " | 25 (C) | 0.28 | 9.2 | 32.8 | ⎭ |
| " | " | " | 50 (H) | 0.19 | 9.3 | 49.0 | ⎫ 49.5 |
| " | " | " | 50 (C) | 0.19 | 9.5 | 50.0 | ⎭ |
| " | " | " | 75 (H) | 0.12 | 9.5 | 79.2 | |
| " | " | TBP | 25 (H) | 0.38 | 9.2 | 23.7 | ⎫ 23.0 |
| " | " | " | 25 (C) | 0.41 | 9.1 | 22.2 | ⎭ |
| " | " | " | 50 (H) | 0.25 | 9.4 | 37.6 | ⎫ 36.9 |
| " | " | " | 50 (C) | 0.26 | 9.4 | 36.2 | ⎭ |
| " | " | " | 75 (H) | 0.155 | 9.5 | 61.3 | |
| ESCAID 350 | 97 | Isodecanol | 25 (H) | 0.25 | 9.1 | 36.4 | ⎫ 37.2 |
| " | " | " | 25 (C) | 0.24 | 9.1 | 37.9 | ⎭ |
| " | " | " | 50 (H) | 0.17 | 9.2 | 54.0 | ⎫ 52.8 |
| " | " | " | 50 (C) | 0.18 | 9.3 | 51.6 | ⎭ |
| " | " | " | 75 (H) | 0.09 | 9.2 | 102 | |
| " | " | TBP | 25 (H) | 0.32 | 9.4 | 29.4 | ⎫ 29.0 |
| " | " | " | 25 (C) | 0.33 | 9.4 | 28.5 | ⎭ |
| " | " | " | 50 (H) | 0.18 | 9.5 | 52.8 | ⎫ 51.2 |
| " | " | " | 50 (C) | 0.19 | 9.4 | 49.5 | ⎭ |
| " | " | " | 75 (H) | 0.10 | 9.7 | 97 | |

(iv) Effect of Free DEHPA.

The effect of free DEHPA was investigated by preparing organic phases containing varying amounts of the sodium salt and equilibrating these phases with aqueous solutions of nickel and cobalt sulphate in 1 M $Na_2SO_4$. The results are shown in Table 6. Examination of Table 6 shows that surprisingly the presence of free DEHPA caused the separation factors to increase although the distribution coefficients decreased with increasing free DEHPA concentration. The separation factor effect is shown graphically in FIG. 7, which shows that the separation factor increase is not only dependent on the concentration of free DEHPA but also on temperature.

TABLE 6

Extraction of Co and Ni from a Mixed $SO_4^=$ Solution by the Na Salt of DEHPA. Effect of Temperature and free DEPHA and is divided into 4 parts, 6A, B, C and D.

6A. No free DEHPA present

Analysis of Aqueous phase, Co, 15.4; Ni, 14.8
$Na_2SO_4$ 1M
Organic phase, Na salt of DEHPA, 0.5M + 5% v/v TBP in Escaid 350

| Temp. °C. | Aqueous phase Co $gl^{-1}$ | Ni $gl^{-1}$ | Organic phase Co $gl^{-1}$ | Ni $gl^{-1}$ | $D_{Co}$ | $D_{Ni}$ | $\beta_{Ni}^{Co}$ |
|---|---|---|---|---|---|---|---|
| 25 | 7.2 | 9.3 | 7.0 | 4.9 | 0.972 | 0.527 | 1.85 |
| 40 | 3.6 | 9.7 | 10.3 | 3.15 | 2.86 | 0.325 | 8.8 |
| 55 | 2.5 | 11.0 | 12.0 | 2.55 | 4.80 | 0.232 | 28.7 |
| 70 | 2.2 | 11.2 | 12.0 | 2.25 | 5.45 | 0.201 | 27.2 |
| 85 | 2.1 | 12.4 | 12.3 | 2.25 | 5.86 | 0.181 | 32.3 |

6B 5% Free DEHPA present

Analysis of head solution, Co, 16.4; Ni, 15.5

TABLE 6-continued

Extraction of Co and Ni from a Mixed $SO_4^=$ Solution by the Na Salt of DEHPA. Effect of Temperature and free DEPHA and is divided into 4 parts, 6A, B, C and D.

$Na_2SO_4$ 1M
Organic phase concns, Na salt of DEHPA, 0.475M
DEHPA, 0.025M; TBP, 5% v/v
Diluent Escaid 350

| 25 | 8.4 | 11.0 | 8.0 | 3.84 | 0.953 | 0.349 | 2.73 |
|---|---|---|---|---|---|---|---|
| 40 | 5.0 | 13.0 | 11.6 | 2.08 | 2.32 | 0.16 | 14.5 |
| 55 | 3.9 | 13.6 | 12.6 | 1.46 | 3.23 | 0.107 | 30.1 |
| 70 | 3.6 | 13.4 | 13.0 | 1.28 | 3.61 | 0.096 | 37.7 |
| 85 | 3.5 | 14.0 | 13.2 | 1.16 | 3.77 | 0.083 | 45.4 |

6C 10% Free DEHPA present

Analysis of head solution as for series B
Organic phase concentrations: Na Salt of DEHPA, 0.45M
Free DEHPA, 0.05M
TBP, 5% v/v
Diluent - Escaid 350

| 25 | 8.4 | 11.9 | 8.4 | 3.56 | 1.0 | 0.299 | 3.34 |
|---|---|---|---|---|---|---|---|
| 40 | 5.3 | 13.4 | 11.8 | 1.56 | 2.23 | 0.1164 | 19.2 |
| 55 | 4.3 | 13.7 | 12.8 | 0.92 | 2.98 | 0.0671 | 44.4 |
| 70 | 4.0 | 14.3 | 13.0 | 0.74 | 3.25 | 0.0516 | 63.0 |
| 85 | 3.8 | 14.2 | 13.0 | 0.62 | 3.42 | 0.0436 | 78.4 |

6D 20% Free DEHPA present

Analysis of head solution as for series B
Organic phase concentrations: Na Salt of DEHPA, 0.40M
Free DEHPA, 0.10M
TRP, 5% v/v
Diluent Escaid 350

| 25 | 8.9 | 12.4 | 8.4 | 2.76 | 0.914 | 0.222 | 4.25 |
|---|---|---|---|---|---|---|---|
| 40 | 6.2 | 13.7 | 10.8 | 1.08 | 1.74 | 0.079 | 22.1 |
| 55 | 5.5 | 14.7 | 11.8 | 0.54 | 2.14 | 0.037 | 58.3 |
| 70 | 5.3 | 14.6 | 12.0 | 0.40 | 2.26 | 0.027 | 82.5 |
| 85 | 5.2 | 14.7 | 12.4 | 0.32 | 2.43 | 0.022 | 111.4 |

B. U.V. and Visible Spectra Studies

Figure 8:
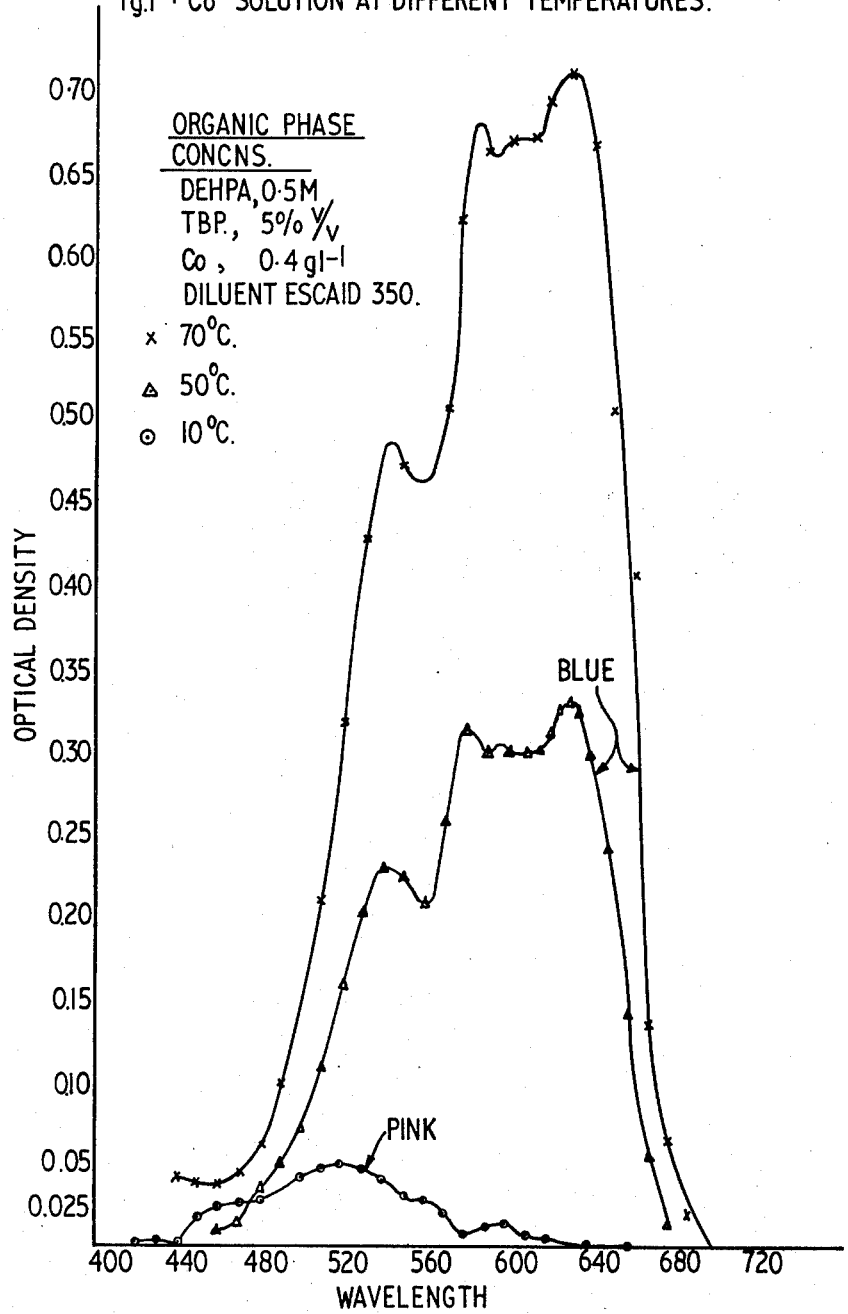

At low $Co^{2+}$ concentrations (1 gl$^{-1}$) the increase in the extraction of Co with temperature was associated with a change in colour of the organic phase from pink to blue. The colour change can definitely be attributed to a change in co-ordination state of the Co complex, since the spectrum of the organic phase indicated that an octahedral complex was present at low temperatures and a tetrahedral complex at higher temperatures as shown in FIG. 8.

The effect of cobalt concentration of the organic phase on its spectrum is shown in FIG. 9. The figure shows that as the cobalt concentration increases the amount of the tetrahedral complex present in the organic phase also increases. The spectrum for the organic phase of cobalt concentration 15.2 gl$^{-1}$, which was fully loaded, was also recorded at different temperatures. Very little change in the spectrum was found over a temperature range of 48° C., namely 25° to 73° C., as shown in FIG. 10, suggesting that only the tetrahedral complex was present in this organic phase. At the lower cobalt concentrations, however, the height of the absorption maximum was found to increase with increase in temperature. Thus the equilibrium between the octahedral and tetrahedral complex is dependent on both temperature and cobalt concentration.

The results of a similar study on nickel bearing organic phases are shown in FIGS. 11 and 12. These spectra show that as the temperature is increased there is a slight shift in the spectrum to longer wavelengths, in contrast to the gross changes with temperature and concentration shown by cobalt.

From the distribution data given in this example it is clear that the separation of cobalt from nickel is dependent on both temperature and cobalt concentration. The change from the pink octahedral complex to the blue tetrahedral complex is achieved either by raising the temperature when the cobalt concentration in the organic phase is low or by increasing the cobalt concentration at constant temperature. While full conversion to the tetrahedral form is achieved by fully loading the organic phase with cobalt, it is obviously not practical to do so throughout a continuous countercurrent contactor. Thus it is desirable to use both temperature and concentration effects and operate at above ambient temperatures, with as high a cobalt content of the organic phase as is practicable.

It is significant that the blue complex does not revert to the pink form on dilution and thus the relative concentration of each appears to be related in some way to the amount of free Na DEHPA present. As this species will have water of hydration associated with it and further, the pink octahedral species is likely to be $CoR_2$ n $H_2O$ (where n has the value 2), then the equilibrium is controlled by the water activity in the organic phase. It is of significance to find that on plotting the optical densities for maximum absorbance of the blue complex from FIG. 9 against the original cobalt loadings in the organic phase a straight line is obtained, FIG. 13. On extending this graph to lower cobalt concentration, however, a curve is obtained, as shown by the dotted line.

If it is assumed that the equilirbium between the pink and blue complexes is of the form

Figure 13:
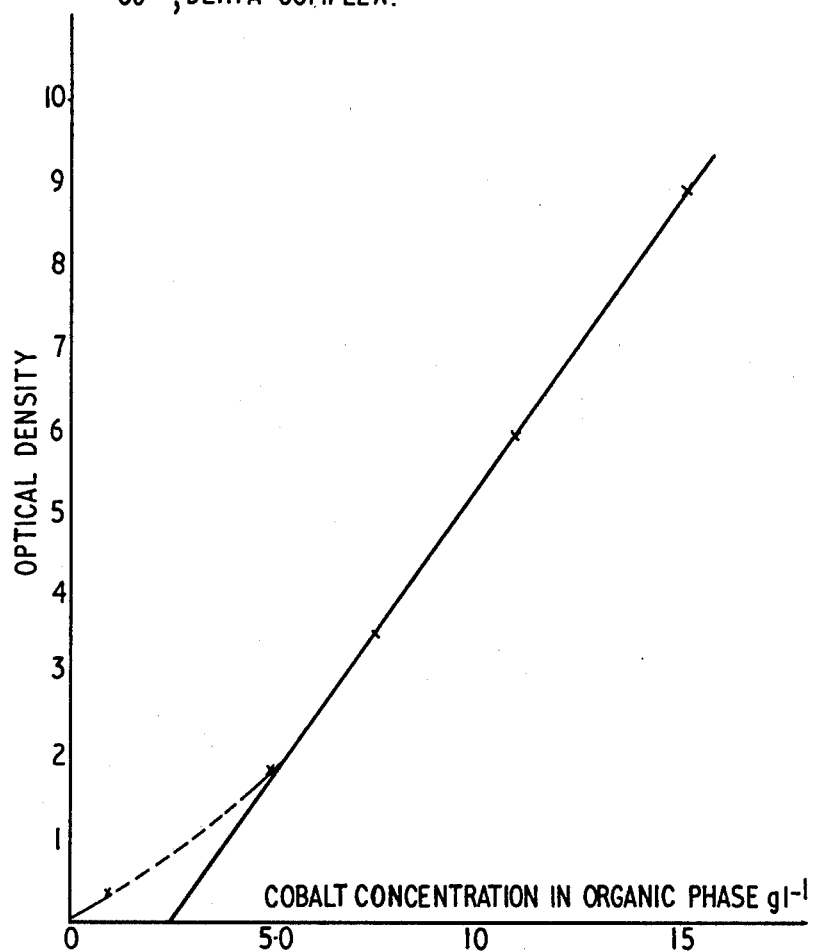
Figure 14:
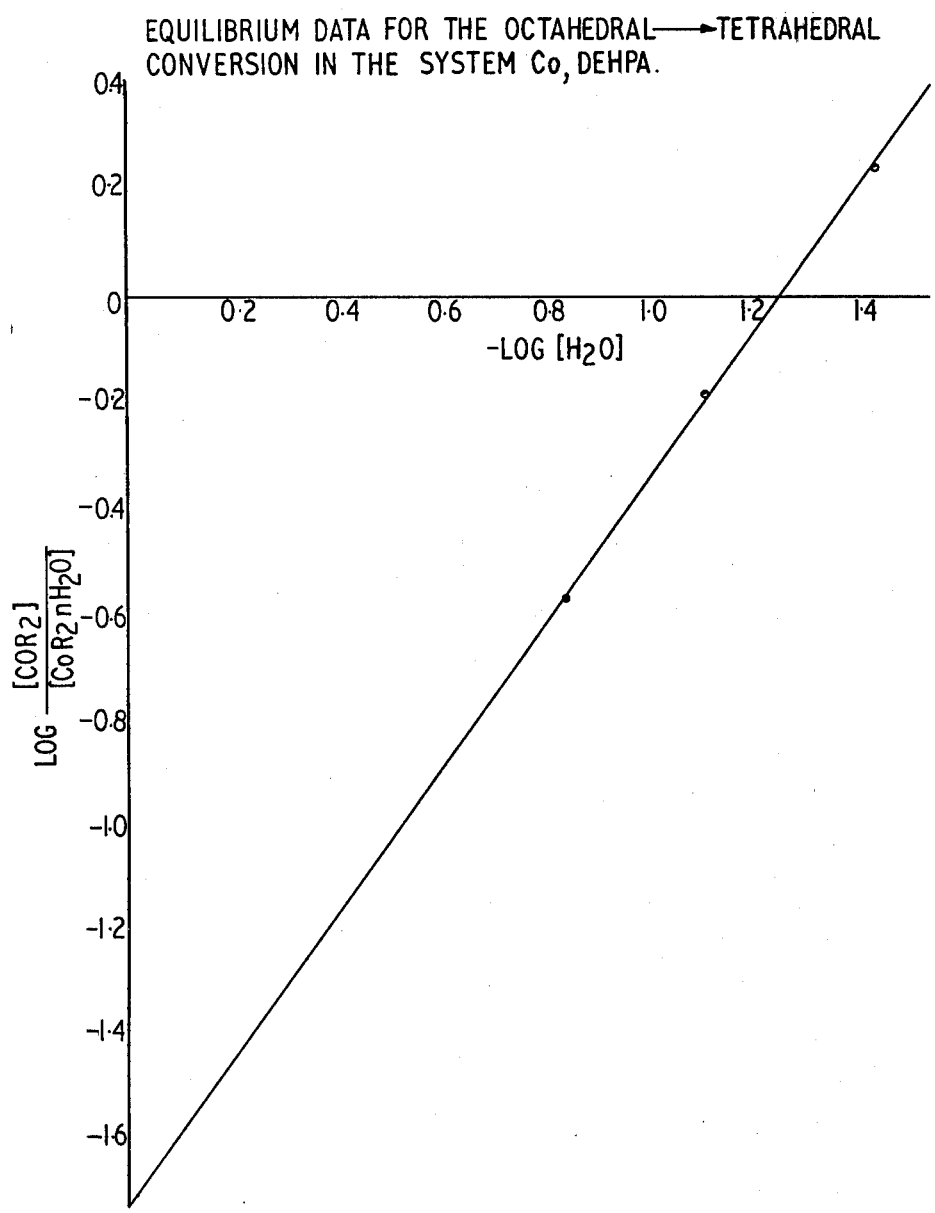

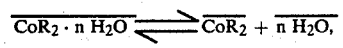

then the equilibrium constant, K, for this reaction is given by:

$$K = \frac{[\overline{CoR_2}] \times [\overline{H_2O}]^n}{\overline{CoR_2 \cdot n\, H_2O}}$$

from which $\log K = \log\left\{\dfrac{[\overline{CoR_2}]}{[\overline{CoR_2 \cdot n\, H_2O}]}\right\} + \log \overline{H_2O}$ Values of $\log\left\{\dfrac{[\overline{CoR_2}]}{[\overline{CoR_2 \cdot n\, H_2O}]}\right\}$ can readily be deduced from FIG. 13 and these results are presented in Table 7, together with values of log $H_2O$ which were obtained from the measured water contents of the original organic phases. A plot of log $$\left\{\frac{\overline{CoR_2}}{\overline{CoR_2 \cdot n\, H_2O}}\right\}$$

versus log $H_2O$ is shown in FIG. 14. This is a straight line and gives a value for n of 1.4. The value of K, obtained from the intercept, is $1.8 \times 10^{-2}$.

Little evidence has been found during investigation for complex polymerisation in the case of nickel but, for cobalt, increasing metal loading is accompanied with increasing viscosity of the organic phase and such increases in viscosity are associated with an increase in the degree of polymerisation of the cobalt complex. Such polymerisation of the complex increases the cobalt distribution coefficient and gives rise to the increase in separation factor additional to that due to the octahedral-tetrahedral complex equilibrium. Polymerisation of the complex might be expected to give rise to an increase in molar absorptivity of the complex and a shift in the absorption maximum to longer wavelengths, particularly if added chelation opportunities arise, thus leading to enhanced complex stability. However, all spectra have been measured on diluted organic phases and no such effects have been observed. It may therefore be concluded that the polymerisation processes are rapid.

It is of interest to see from this example that increasing the content of free DEHPA in fact increases the separation factor, where the depolymerising action might have been expected to decrease this parameter. In the presence of free DEHPA, the pH of the aqueous phase will decrease due to DEHPA partition and ionisation. This pH change is responsible for the fall in distribution coefficient values of both cobalt and nickel with increasing free DEHPA. An increase in the separation factor indicates that the degree of sodium salt conversion achieved in the system is not critical with regard to cobalt-nickel separation and is only important in terms of the amount of metal transferred per unit volume of organic phase.

TABLE 7.

Equilibrium Data for the Octahedral → Tetrahedral Conversion in the System Co II, DEHPA

| Cobalt in Original soln gl$^{-1}$ | O.D. | CoR$_2$ gl$^{-1}$ | CoR$_2$ mM L$^{-1}$ | CoR$_2$·nH$_2$O gl$^{-1}$ | CoR$_2$·nH$_2$O mM L$^{-1}$ | $\log\left[\left\{\dfrac{[CoR_2]}{[CoR_2 \cdot nH_2O]}\right\}\right]$ | H$_2$O in original organic gl$^{-1}$ | H$_2$O diluted sample gl$^{-1}$ | M | log H$_2$O |
|---|---|---|---|---|---|---|---|---|---|---|
| 15.2 | 0.88 | 0.20 | 3.39 | 0 | 0 |  | 8 | 0.107 | 0.0059 | −2.227 |
| 10.9 | 0.61 | 0.139 | 2.36 | 0.79 | 1.34 | 0.2454 | 34 | 0.68 | 0.0378 | −1.423 |
| 7.5 | 0.35 | 0.079 | 1.34 | 0.121 | 2.05 | −0.1852 | 53 | 1.41 | 0.0785 | −1.105 |
| 9.0 | 0.185 | 0.042 | 0.71 | 0.158 | 2.68 | −0.5755 | 66 | 2.64 | 0.147 | −0.834 |

The effect of diluent and diluent modifier is that the distribution coefficient of both nickel and cobalt increase with increasing aromatic content of the diluent. For nickel, use of isodecanol as the diluent modifier produces higher distribution coefficients than the TBP modified system (Table 5). The opposite is true for cobalt and thus TBP is the preferred diluent modifier for plant operation.

EXAMPLE 7

In this example an organic phase fully loaded with cobalt was contacted with an aqueous solution containing an equal concentration of nickel over a temperature range the following results were obtained:

DEHPA concentration=0.5 M in ESCAID 350+5 v/o TBP
Cobalt concentration in initial organic phase=14.8 gl$^{-1}$.
Nickel concentration initial aqueous phase=14.6 gl$^{-1}$
Phase ratio A/O=1.0

| Temperature °C., | Final Metal Distribution | | | | Separation Factor. $\beta_{Ni}^{Co}$ |
|---|---|---|---|---|---|
|  | Aqueous Phase. | | Organic Phase | | |
|  | Co gl$^{-1}$ | Ni gl$^{-1}$ | Co gl$^{-1}$ | Ni gl$^{-1}$ | |
| 25 | 4.8 | 9.0 | 9.0 | 7.1 | 2.4 |
| 40 | 3.4 | 11.7 | 10.6 | 3.5 | 10.4 |
| 55 | 2.1 | 13.0 | 11.8 | 2.3 | 31.8 |
| 70 | 1.6 | 13.2 | 12.5 | 1.8 | 57.3 |
| 85 | 1.4 | 13.5 | 12.7 | 1.8 | 68.0 |

These results show that the separation factor increases with temperature and that the process could not operate at room temperature.

Figure 15:
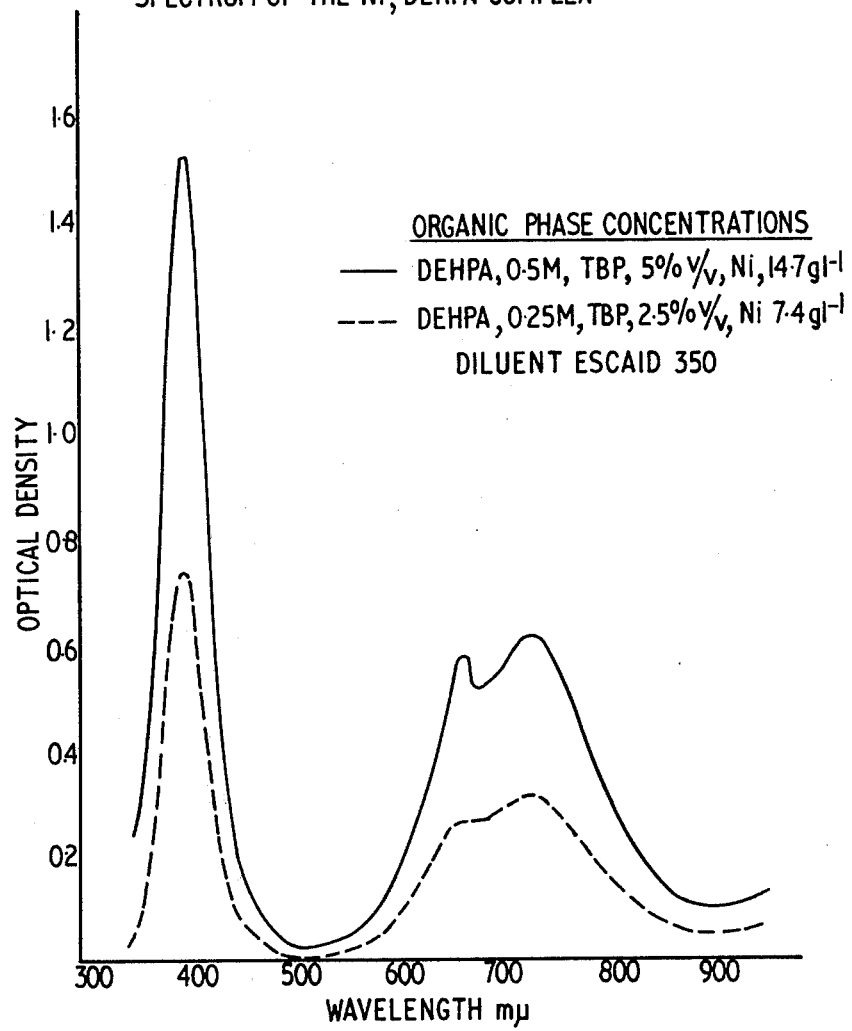
Figure 16:
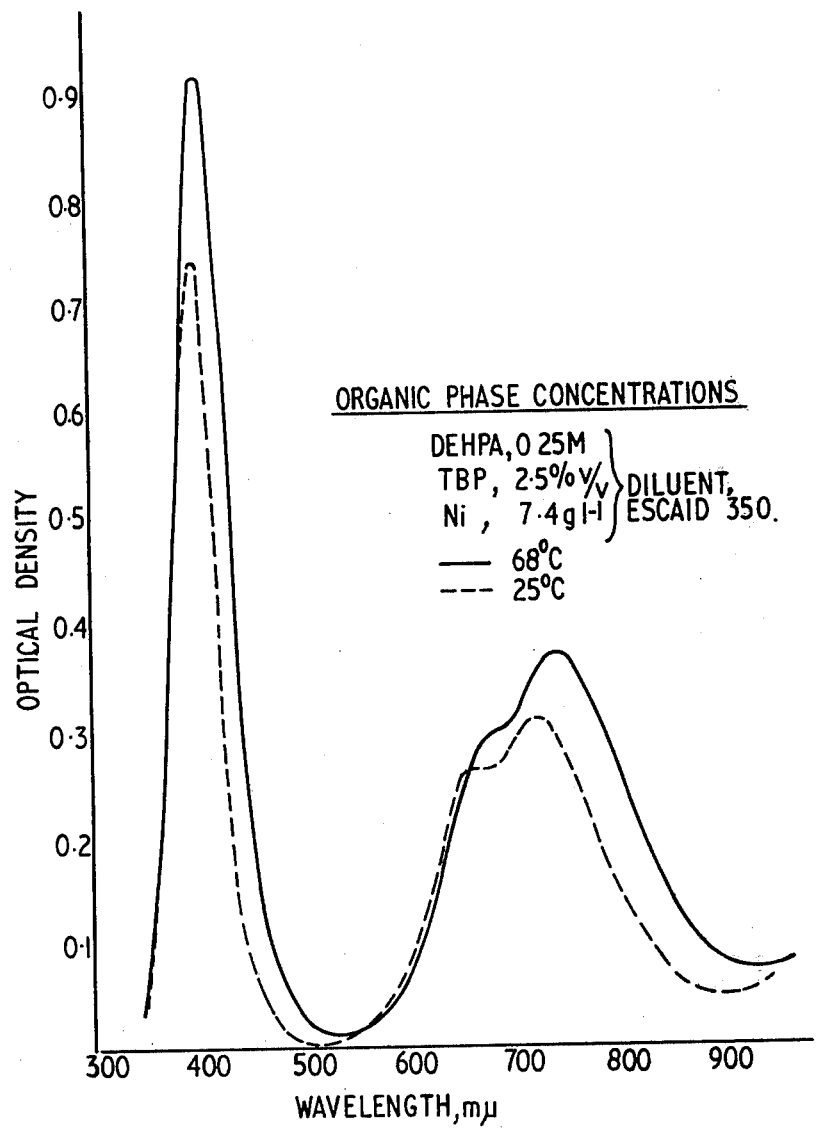

The spectra of two nickel loaded organic phases were recorded and are shown in FIGS. 15 and 16. FIG. 15 shows a peak at 400 mμ so the nickel complex is octahedral. The two concentration levels show that Beers Law is obeyed. FIG. 16 shows the effect of temperature and indicates a slight increase in peak height with temperature, and a slight shift to longer wavelengths but no radical change that would suggest change in co-ordination number. Thus, cobalt changes co-ordination number and degree of polymerisation with temperature and concentration while nickel remains octahedral throughout with little sign of polymerisation.

What we claim is:

1. In a process for the separation of cobalt from nickel by solvent extraction which comprises contacting an aqueous solution containing divalent cobalt and nickel ions in the octahedral configuration with an organic phase containing an ester of phosphoric acid and then separating the organic phase containing cobalt from the aqueous phase containing nickel, the improvement which comprises carrying out said contact at a temperature in the range of 40° C. to 90° C. a concentration of 11 to 16.0 grams per liter of cobalt in the organic phase so as to convert substantially all the cobalt present in the organic phase from an octahedral configuration to a tetrahedral configuration and thus enable the said organic phase to preferentially extract cobalt rather than nickel, the latter remaining in the octahedral configuration and in the aqueous phase.

2. A process according to claim 1 wherein the temperature is within the range 45°–86° C.

3. A process according to claim 4 wherein the temperature is within the range 50°–70° C.

4. A process according to claim 1 wherein the concentration of cobalt in the organic phase is within the range 12 to 15.6 grams per liter.

5. A process according to claim 4 wherein the concentration of the cobalt is within the range 12 to 15.2 grams per liter.

6. A process according to claim 4 wherein the concentration of the cobalt in the aqueous solution is 12 grams per liter and the process is carried out at a temperature of 45° C.

7. A process according to claim 1 wherein the solvent extraction reagent has the formula:

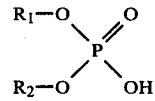

where R$_1$ and R$_2$ are the same or different and are each a substituted or unsubstituted alkyl, aryl or aralkyl radical and in which R$_1$ or R$_2$ may be hydrogen.

8. A process according to claim 7 wherein the reagent contains a total of at least 12 carbon atoms.

9. A process according to claim 7 wherein each R group of the reagent contains at least 8 carbon atoms.

10. A process according to claim 7 wherein the solvent extraction reagent is a di-alkyl phosphoric acid.

11. A process according to claim 7 wherein the solvent extraction reagent is di-(2-ethyl hexyl)phosphoric acid.

12. A process according to claim 11 wherein the solvent extraction reagent is in the form of its sodium salt.

13. A process according to claim 1 wherein the reaction is carried out at a pH value of at least 4.

14. A process according to claim 13 wherein the pH is within the range of 4 to 6.

15. A process according to claim 1 wherein the solvent extraction reagent is dissolved in an organic diluent.

16. A process according to claim 15 wherein the organic diluent is an aromatic aliphatic hydrocarbon or halogenated hydrocarbon.

17. A process according to claim 16 wherein the aromatic diluent has an aromatic content of up to 97 v/v %.

18. A process according to claim 2 wherein the solvent extraction reagent contains an additive to assist phase separation.

19. A process according to claim 20 wherein the additive is selected from the group consisting of tributyl phosphate and isodecanol present in an amount within the range 3–5 v/v % of the organic phase.

20. A process according to claim 19 containing up to 20 v/v % free di-(e-ethyl hexyl)phosphoric acid.